United States Patent [19]

Jurisch

[11] Patent Number: 5,308,967
[45] Date of Patent: May 3, 1994

[54] DATA CARRIER FOR IDENTIFICATION SYSTEMS

[76] Inventor: Reinhard Jurisch, Zschopauerstr. 3, 0-5067 Erfurt, Fed. Rep. of Germany

[21] Appl. No.: 861,859

[22] PCT Filed: Oct. 12, 1991

[86] PCT No.: PCT/DE 91/00803
§ 371 Date: Jan. 18, 1992
§ 102(e) Date: Jan. 18, 1992

[87] PCT Pub. No.: WO92/08209
PCT Pub. Date: May 14, 1992

[30] Foreign Application Priority Data

Oct. 26, 1990 [DE] Fed. Rep. of Germany ....... 4034225

[51] Int. Cl.⁵ .................... G06K 19/06; H01L 27/02
[52] U.S. Cl. ................................... 235/492; 257/531
[58] Field of Search ............ 257/922, 926, 679, 531; 235/449, 492

[56] References Cited

U.S. PATENT DOCUMENTS

| | | | |
|---|---|---|---|
| 4,605,844 | 8/1986 | Haggan | 235/380 |
| 4,650,981 | 3/1987 | Foletta | 235/449 |
| 4,692,604 | 9/1987 | Billings | 235/493 |
| 4,791,285 | 12/1988 | Ohki | 235/449 |
| 4,797,541 | 1/1989 | Billings et al. | 235/449 |
| 4,818,853 | 4/1989 | Ohta et al. | 235/492 |
| 4,910,394 | 3/1990 | Ohta | 235/492 |
| 4,960,983 | 10/1990 | Inoue | 235/449 |

FOREIGN PATENT DOCUMENTS

| | | |
|---|---|---|
| 0079047 | 5/1983 | European Pat. Off. . |
| 3721822 | 11/1988 | Fed. Rep. of Germany . |
| WO89/05067 | 6/1989 | PCT Int'l Appl. . |

Primary Examiner—Donald Hajec
Assistant Examiner—Jeffrey R. Filipek
Attorney, Agent, or Firm—Jordan and Hamburg

[57] ABSTRACT

A data carrier in which all integrated circuits are monolithically integrated in a single chip and at least one non-displaceably connected antenna coil is monolithically provided right upon the active semiconductor areas of the chip upon partial ranges of the uppermost conductive paths.

5 Claims, 3 Drawing Sheets

DATA CARRIER FOR IDENTIFICATION SYSTEMS

FIELD OF THE INVENTION

The invention relates to a data carrier for identification systems, particularly for use in so-called ident systems which are preferably required in many fields of automation such as self-identification of tools or pallets.

BACKGROUND OF THE INVENTION

In the state of art data carriers of this kind are known. The most commonly used are the so-called chip-cards (as disclosed in DE-PS 3.721.822 and EP 79.047) in which sufficient space is provided for mounting individual discrete circuits. Such cards do not satisfy high requirements concerning transmission effectivity, that is, concerning the voltage and output transmission factor, respectively. DE-PS 3.721.822 discloses a solution in which the antenna coil is small, being applied around the semiconductor chip remote from the active semiconductor areas, and which is easy to produce by simultaneously structuring the conducting and coil patterns. This solution, however, does not ensure a high transmission effectivity owing to the considerably high resistance/capacitance product due to parasitic capacities and layer resistances. The conditions with such data carriers are different, which, for example, are used for tool identification by interacting with a read or write/read unit through remote inductive energy and signal transmission. In this event a high transmission effectivity is required. Such components are exclusively sold as hybrid members. They ensure a high quality of the antenna coils by employing wound coils bonded to further individual discrete elements. Such data carriers are inserted then into bore holes provided in the tool. The structural setup of such data carriers which is comparatively bulky apart from the manner of insertion into a tool requires high technological expenditures due to the connection of the individual components necessary such as coil, logic, storage, and power supply which finally renders the data carrier expensive.

SUMMARY OF THE INVENTION

Hence, it is an object of the invention to provide a data carrier which ensures, in addition to a high degree of minimizing, the transmission effectivity required at a very high transmission frequency. It is a further object of the invention to ensure an efficient energy coupling to microelectronic components. According to the invention these objects are realized by integrating a decoding circuit, a storage circuit, a circuit for providing the supply voltage for the electronic circuits and the antenna coil(s) on a single chip, to thus eliminate the otherwise expensive mounting and connection of the individual components. The reliability is thereby increased and the geometry of the data carrier considerably minimized. The embodiment of the invention and mounting of the antenna coil(s) permits realization a high coil quality which ensures a high transmission factor as concerns voltage and output.

BRIEF DESCRIPTION OF THE DRAWING

The invention will be described hereinafter by means of two embodiments and wherein.

DESCRIPTION OF THE PREFERRED EMBODIMENTS

Figure 1:
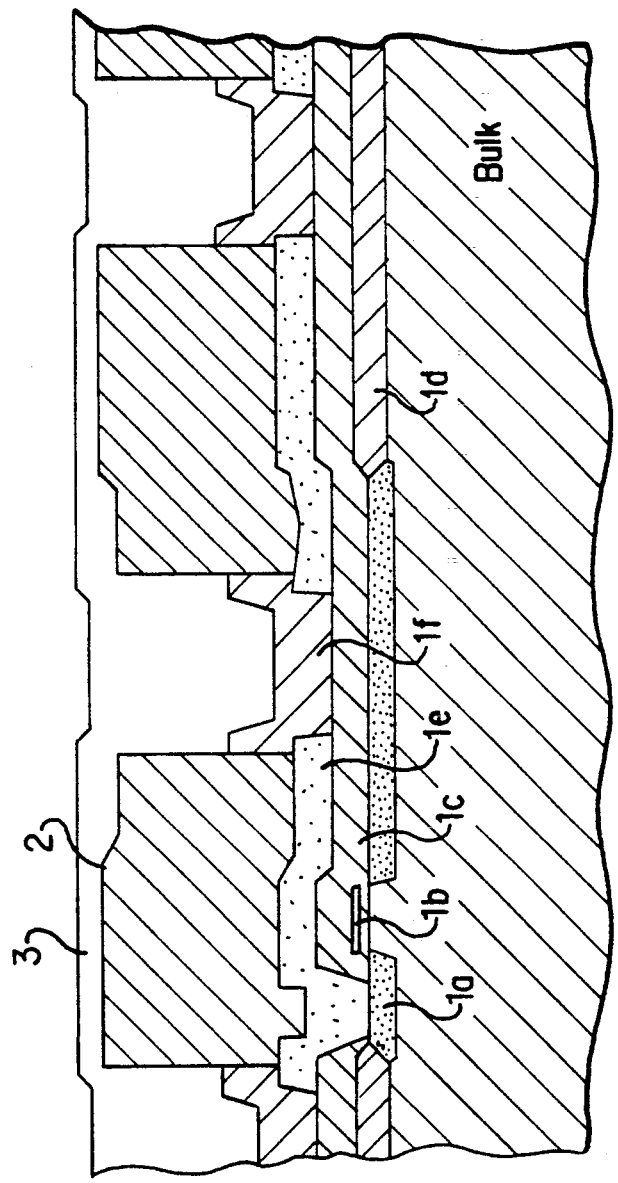
FIG. 1 shows a cross-sectional view of a data carrier including a low-ohmic coil monolithically provided to the uppermost contactive path area.

FIG. 1 shows one embodiment of an inventional data carrier in which the integrated coil is devised monolithically and compatibly to the semiconductor technology known heretofore as well as in direct contact to the conductive path of the semiconductor structure and which is arranged in the area of the active semiconductor structure. On the "bulk" of a semiconductive material a semiconductive structure is arranged comprising a diffusion area 1a, a poly-silicon gate 1b, a field insulating layer 1d, an intermediate insulating layer 1c, a metal layer conductive path 1e, a passivation layer 1f, being part of the integrated circuit of the chip. The metal layer 1e and the windows in the passivation layer 1f correspond in this embodiment as concerns their lateral geometry, with the exception of overlappings due to the manufacturing technology, to the low ohmic coils 2 according to the invention. The materials of the windings of the low-ohmic coils are selected from metals of high electrical conductivity, and are in electrical contact with the metal layer 1e and dimensioned for a transmission frequency of two megahertz with a layer thickness greater than 5 $\mu$m, e.g. of 8 $\mu$m, a path width of about 15 $\mu$m and a spacing of 10 $\mu$m.

Figure 2:
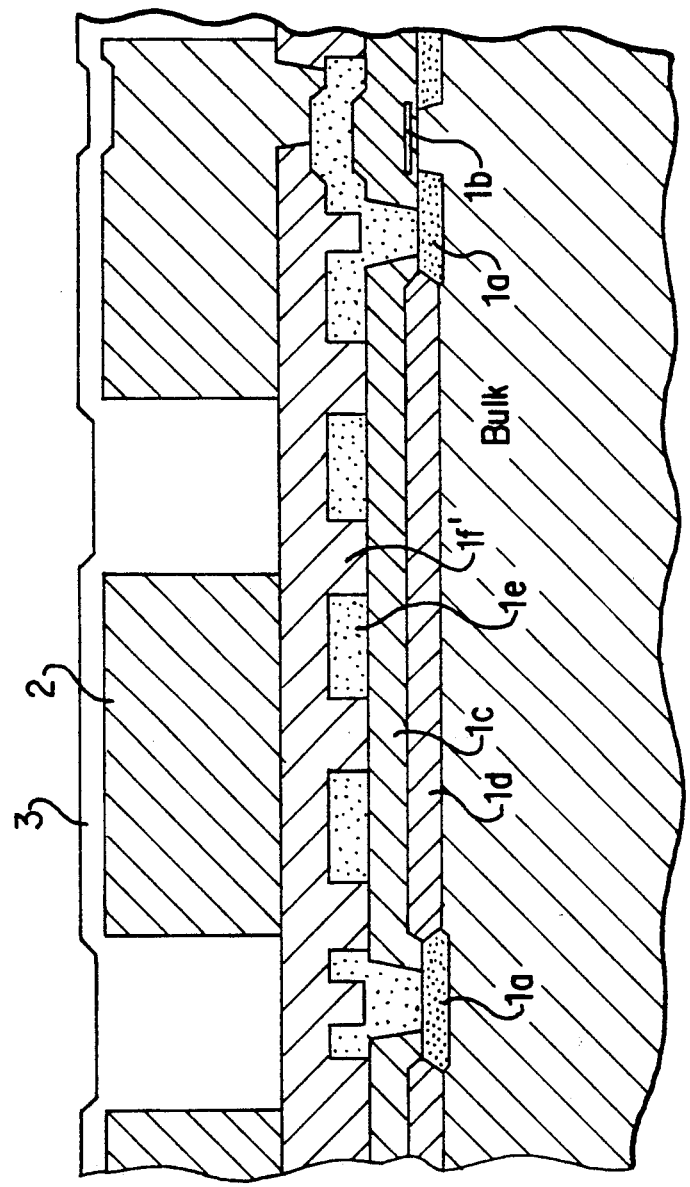
FIG. 2 shows a cross-sectional view of a data carrier including a low-ohmic coil provided on a planarised passivation layer.
Figure 3:
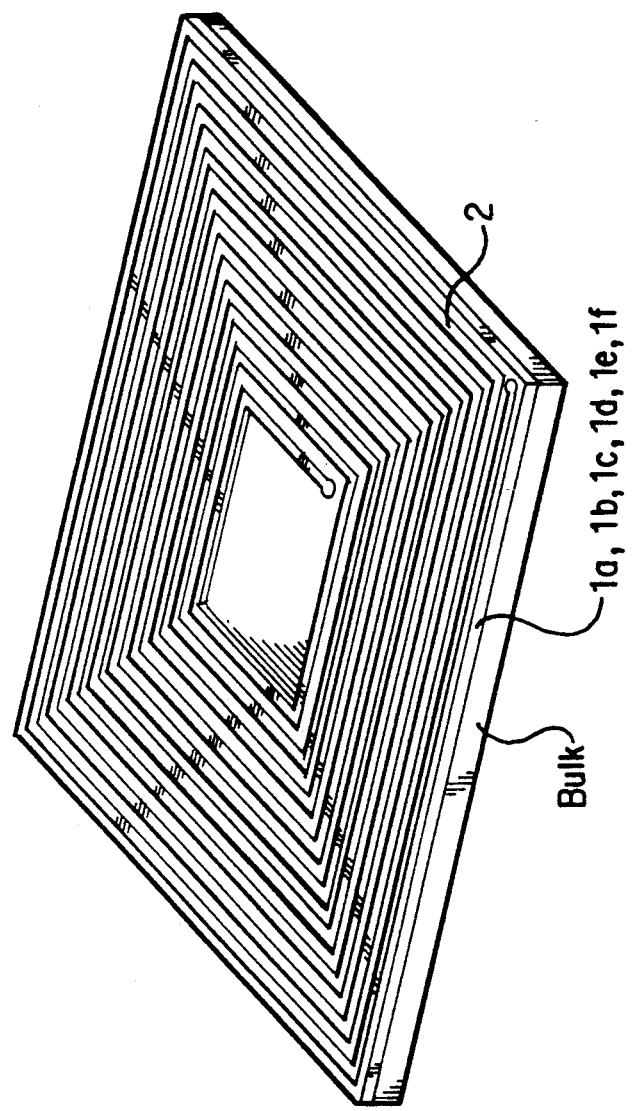
FIG. 3 is a perspective view of the data carrier of FIG. 1.

FIG. 2 shows an embodiment of an inventional data carrier in which the integrated coil is devised monolithically and compatibly with semiconductor technology known heretofore on top of the passivation layer 1f of the semiconductor structure and which according to the invention is arranged within the active semiconductor structure. The integrated circuit of the chip comprises a semiconductor material of a "bulk", diffusion areas 1a, a poly-silicon grid 1b, a field insulation 1d and a passivation layer 1f, advantageously, the passivation layer 1f surface is planarised. The electrical connection between a metal layer 1e and the low-ohmic coil 2 is established via a local contact window. Although the windings of the low-ohmic coils have the same geometry as in FIG. 1, higher frequencies are obtained. In accordance with the invention, the lowest ohmic partial coil may have a conductive path cross-section such that it has an area resistance of $\leq 5$ $\mu$m/□.

In comparison with FIG. 1 the metal layer 1e can be employed at will independently of the coil 2. So, in particular, the metal layer 1e can be embodied as an additional coil which operates on the chip under different conditions, such as frequency, transmission efficiency, or coupling different circuit functions.

The antenna coil can be arranged vertically and/or horizontally split up into several coil ranges of different electrical resistances and the individual coil ranges can be at least partially electrically connected to one another and can be connected via several tappings to a circuit member for supplying at least the voltage supply and/or the signal modulation and or signal demodulation. The magnetic winding direction of the coils can be the same or opposite. In the event of splitting only the low-ohmic coil realizes the splitting ratio. In both examples of embodiment the so-called bump technology (electro-plating-process) is employed for manufacturing at least the low-ohmic coil. Thus it is feasible to monolithically integrate the latter in a technological step compatible with a wafer process. Advantageously the material for the low-ohmic coil is substantially selected from gold. In both Figures the end passivation serves to stabilize the low-ohmic coil windings 2 as well as to entirely protect the integrated chips. In both examples of embodiment the low-ohmic coil exhibits a means effective diameter of, for example, 4 mm. The external coil geometry can be embodied optionally, however, an octogonal non-equilateral geometry is preferred in order to obtain an optimal matching to the square or rectangular chip geometry.

I claim:

1. Data carrier chip for identification systems comprising at least one integrated circuit including active semiconductor areas and uppermost conductive path structures and one coil arrangement connected to said integrated circuit, said coil arrangement being substantially located above the active semiconductor areas of the data carrier chip on sections of the uppermost conductive path structures, the improvement wherein the windings of said coil arrangement include a low-ohmic portion that is exclusively and monolithically provided on the data carrier chip itself with a cross sectional thickness in a direction parallel to the normal of the chip being greater than 5 $\mu$m, said coil arrangement being aligned with said active semiconductor areas in said direction normal to said coil arrangement.

2. Data carrier chip for identification systems as claimed in claim 1, wherein the material of the low-ohmic portion of the coil arrangement windings is selected from a different material of lower specific resistance than the material of the uppermost conductive path structures.

3. Data carrier chip for identification systems as claimed in claim 1 wherein said coil arrangement includes a first and second coil, said first coil being lower ohmic than said second coil and having an area resistance of $\leq 5$ m $\Omega/\square$.

4. Data carrier chip for identification systems as claimed in claim 1, wherein the material of the low-ohmic portion of the coil arrangement windings is substantially gold.

5. Data carrier chip for identification systems as claimed in claim 1, wherein at least the low-ohmic portion of the arrangement windings is manufactured by bump technology electro-plating-process.

* * * * *